United States Patent [19]

Thiele et al.

[11] 4,133,903

[45] Jan. 9, 1979

[54] PROCESS FOR PREPARING BITTER BEVERAGES

[75] Inventors: Kurt Thiele; Heinz O. Bernhard, both of Zofingen, Switzerland

[73] Assignee: Siegfried Aktiengesellschaft, Zofingen, Switzerland

[21] Appl. No.: 747,986

[22] Filed: Dec. 6, 1976

[30] Foreign Application Priority Data

Dec. 4, 1975 [CH] Switzerland .................. 15764/75

[51] Int. Cl.$^2$ .............................................. A23L 2/00
[52] U.S. Cl. .................................. 426/590; 426/592; 426/655
[58] Field of Search ............... 426/590, 591, 592, 600, 426/655, 650, 15, 330.3, 330.4, 330.5

[56] References Cited

PUBLICATIONS

Suchy et al., Coll. Czech. Chem. Commun. 25, (1960), pp. 507–513.

Primary Examiner—Raymond N. Jones
Assistant Examiner—Elizabeth A. Hatcher
Attorney, Agent, or Firm—Werner W. Kleeman

[57] ABSTRACT

A bitter beverage and process for forming the same, which comprises an aqueous solution containing cynaropicrin as such in a concentration of at least 2.5 mg/liter, the solution having a pH-value of not more than 7.0.

20 Claims, No Drawings

PROCESS FOR PREPARING BITTER BEVERAGES

BACKGROUND OF THE INVENTION

The present invention relates to a process for the preparation of bitter tasting beverages, containing as bitter principle cynaropicrin, and also relates to bitter tasting beverages produced thereby.

Cynaropicrin is a known plant ingredient with intense bitter taste. Plants and vegetable matter containing bitter compounds as well as bitter principles isolated therefrom have been used for considerable time as antipyretics. Extracts containing bitter principles as well as isolated bitter substances are used today mainly for the preparation of bitter beverages stimulating appetite and digestion, primarily however to be consumed in the luxury food and drinks trade. Besides beer, containing bitter hop extract, there have appeared bitter beverages with higher alcohol contents such as aperitifs, liqueurs and others, containing in addition to flavouring and sweetening agents extracts from different species of the plant family Compositae and the genus Citrus. Besides them, bitter tasting and more or less flavoured and sweetened carbonated waters (so called tonic waters have) became commercially very important. The main ingredients for bitter beverages of this kind are ingredients of the genus Citrus and especially quinine. Quinine has been used since the 17th century for combatting malaria fever. Quinine however exerts at higher doses relatively complex pharmacodynamic effects. Its use in beverages is therefore by no means harmless. For this reason the beverage industry has attempted to replace quinine by pharmacologically less harmful bitter compounds.

SUMMARY OF THE INVENTION

The aim of the present invention is therefore to provide the beverage industry with a bitter compound equal to quinine in regard to its bitter value as well as the other tasting qualities, without having its unwanted physiological and pharmacological secondary effects.

A first step towards solving this task has been realized in accordance with the present invention by discovering that cynaropicrin complies with these requirements. Cynaropicrin is a known ingredient of certain plant species of the genus Cynara, namely the artichoke (*Cynara scolymus* L.) and the cardoon (*C. cardunculus* L.). Cynaropicrin is also present in other taxa of the family Compositae especially in leaves and stalks but not in the edible receptacles of the artichoke (see Hegnauer, Chemotaxonomie der Pflanzen, Vol. 3, Basel/Stuttgart 1964, pages 475 ff.)

The utilization of artichoke extracts for the preparation of beverages is known and aperitifs containing such extractions enjoy great popularity. For the preparation of such beverages one has used up to now primarily raw or somewhat purified extracts which therefore do consist of a mixture of different compounds. One of these, cynarin (a cinnamic acid derivative with no chemical relationship to cynaropicrin) has aroused some interest and found application even in isolated form.

Despite the fact that the amount of cynaropicrin in the plant exceeds the cynarin content, there has never been any proposal to isolate cynaropicrin in order to use it on an industrial scale. The inherent chemical instability of cynaropicrin due to its tendency to spontaneous polymerization seems to make it unprofitable to explore it any further. Whenever small quantities of cynaropicrin are found in artichoke extracts or in beverages containing such extracts, then the amount present represents the unconverted residual amount of the cynaropicrin previously present in the plant.

Now, according to another very important aspect of the invention there is provided for the first time a method for inhibiting auto-polymerisation of cynaropicrin.

Unexpectedly it has been found that the polymerization which most likely occurs due to lactone ring opening can be prevented when in all steps of the extraction, purification, storage, manufacturing and usage care is taken that cynaropicrin is never in contact with an aqueous medium having a pH greater than 7. This means, that the chemical stability of the compound is fully guaranteed whenever aqueous cynaropicrin-solutions are kept in a slightly acidic range, that means at pH-values between 7 and 2 preferably between 2.5 and 5.7.

A further important feature of the invention is therefore that for the first time cynaropicrin is made available in a pure and stable form for industrial use, especially in the beverage industry. The use of chemically pure cynaropicrin presents in comparison with the use of extracts obviously many advantages, in particular the possibility of exact dosage. The amount of bitter-compound in the product (i.e. in the finished beverage or in a concentrate to be used for the manufacture of beverages) can be monitored much easier and the guarantee of the content can be highly improved in comparison with the use of extracts comprising a mixture of different natural products. In addition, extracts are more or less red-brown colored, whereas pure cynaropicrin gives completely colorless solutions. This fact is of great importance for the production of bitter tasting, carbonated beverages, which contain cynaropicrin as bitter compound instead of quinine.

Cynaropicrin, systematically named 2-propenoic acid 2-(hydroxymethyl)-dodecahydro-8-hydroxy-3,6,9-tris(-methylene)-2-oxoazoleno [4,5-b-furan-4-yl] ester can be obtained by known means through extraction of the above mentioned plants. Compare Coll. Czech. Czech. Chem. Comm. 25, 507 (1960) and 25, 2777 (1960); Phytochemistry 12, 221 (1973); Planta Media 25, 149 (1974) and 25, 174 (1974).

Cynaropicrin is a tan colored amorphous, strong hygroscopic powder. It is very soluble in alcohol; a solubility of 1.75 g/l has been obtained in water at 20° C., an amount more than sufficient for beverages in view of its bitterness value. As has been found it is practically unlimitedly stable in carbonated water as well as in demineralized water with a pH 5.65. In boiling demineralized water chemical decomposition occurs only after 3 hours.

Cynaropicrin has a bitterness value twice as high as that of Quinine, namely 1: 400'000 (determined according to Pharmacopoea Helvetica VI, Suppl. 1-1973, page 183 a).

Pharmacological testing of Cynaropicrin with animals has shown that it has no influence upon the central nervous system, none upon the function of the gastro intestinal tracts even at very high dosages, nor does it produce any significant peripheral activities. Furthermore, the results of these experiments have shown that the hypersensitivity as encountered with quinine (cinchonism) is not to be expected with Cynaropicrin. The following values of acute toxicity have been determined: $LD_{50}$ per os in propylene glycol solution approximately 375 mg/kg in mice and approximately 495 mg/kg in rats. By taking into account average values of different experimental models the acute toxicity is higher by a factor of about 1.6 than with Quinine. The difference in toxicity is however more than compensated by the higher bitterness value of Cynaropicrin in comparison to Quinine which means that only half the amount of Cynaropicrin by weight must be used for the preparation of beverages.

Moreover, the amount of Cynaropicrin in a final beverage is less than 100 mg/liter, which means that the daily intake per person does not exceed 1 mg/kg body weight. The intake of cynaropicrin is therefore well below the toxic level.

DETAILED DESCRIPTION OF THE INVENTION

Now, the process of the invention for preparing bitter tasting beverages comprises admixing a suitable amount of cynaropicrin either in solid form or as a concentrated solution while maintaining a pH value of less than 7 to a non alcoholic or alcohol containing aqueous base liquid optionally containing the usual additives as e.g. sweetening agents, flavours, colorants, physiologically acceptable acids etc.

No protection is, however, claimed for preparing beverages comprising the known extracts of plants of any Cynara species and other species belonging to the Compositae family which contain cynaropicrin among a plurality of different plant ingredients.

The amount of added cynaropicrin depends on the kind of beverage and particularly on whether the beverage concerned is usually consumed as a non-diluted drink or after dilution with water. In the case of mineral waters such as the so called Tonic Waters the amount of cynaropicrin lies in the range from 10 to 50 mg/liter and preferably between 20 and 50 mg/liter. An alcoholic beverage of the type of an Aperitif which usually is diluted with water in an approximate ratio of between 1:1 to 1:10 should preferably contain between 50 and 500 mg Cynaropicrin per liter. In the presence of other bitter compounds the concentration of Cynaropicrin can be as low as e.g. 2.5 mg/liter.

The chosen pH value depends on the kind of beverage and its additional ingredients (especially the addition of acids is dictated by the taste of the public). The pH value should remain within the range within which the characteristic of a particular beverage is not lost. The limits of the pH range are therefore dictated by the beverage and there should be considered for beer (pH 4-5) and lemon juice (pH 2.0-2.4). A pH between 2.5 and 4 is the preferential rule.

The practical performance of the process depends therefore on the type of beverage wanted.

For the producton of a "pop" beverage one prepares accordingly two solutions. One aqueous solution containing 60% sugar, the other solution (the base) is made up from the following substances:
1.2 kg orange essence (1%)
1.0 kg aqueous citric acid solution (50%)
1.0 kg aqueous lactic acid solution (50%)
0.5 kg aqueous tartaric acid solution (50%)
0.2 kg alcoholic cynaropicrin solution (20%)
1.1 kg water Such a base can further contain suitable dyes, additional essences, fragrances, bitter compounds etc. 5 kilo of the base are then mixed with 95 kg sugar solution (60%) to a syrup. This syrup is diluted in the bottle by a tenfold amount of carbonated water (water saturated by carbon dioxide).

This procedure can be varied e.g. on the one hand by preparing a solution of 50 kg sugar and 2.1 kg citric acid monohydrate in 60 liter of water and on the other hand by dissolving 20 g cynaropicrin in 0.1 liter of an alcoholic lemon-oil solution (1%). Both solutions are combined and water is added to a total volume of 100 liter and then filtered. 200 ml of such obtained concentrate is filled up in a bottle with carbonated water to 1 liter. In case that the concentrate or the syrup is not used immediately for the preparation of a finished beverage pasteurization is mandatory, e.g. through heating in a closed vessel to 80° C. during 10 minutes.

For the production of aperitif-beverages, bitter brandies, bitter-liquor, vermouth-like beverages and so on the admixture of cynaropicrin may be effected by principally analoguous methods, i.e. it is added either in solid form or as a solution or a concentrate and if desired together with additives such as aromas, essences, sweeteners, dyes etc. If in the production of beer cynaropicrin is used to partially or totally replace bitter hops extract it is advantageously added as an alcoholic solution at the end of the fermentation stage.

It should be emphasized that cynaropicrin can be used for the preparation of beverages in combination with any usual and legally allowed additives, e.g. sweeteners, aroma compounds, dyes, essences, extracts, thickeners as well as additional bitter compounds and furthermore with physiologically harmless acids (e.g. citric-, lactic-, tartaric-, malic- or phosphoric acid), vitamins (e.g. ascorbinic acid), stimulants (e.g. coffein or Cola-extracts) etc.

The invention shall also include a beverage obtained by the process specified above as well as a means to perform the said process, namely a concentrate, basic liquid or syrup containing cynaropicrin in an amount of up to 100 g/liter and more.

The working of the invention may however be limited by legal prescriptions, in particular by food laws.

What we claim is:

1. An aqueous solution containing substantially pure and stable cynaropicrin in a concentration of at least about 10 mg/liter, the solution having a pH value of from about 2.0 to 5.7.

2. An aqueous solution as claimed in claim 1, which has a pH of from 2.5 to 5.7.

3. An aqueous solution as claimed in claim 1, which is a non-alcoholic beverage, comprising cynaropicrin in a concentration of from 10 to 50 mg/liter.

4. An aqueous solution as claimed in claim 3, which has a pH of from 2.5 to 4.0.

5. An aqueous solution as claimed in claim 3, which is carbonated.

6. An aqueous solution as claimed in claim 3, which contains an edible acid in a physiologically safe concentration.

7. An aqueous solution as claimed in claim 3, which contains a fragrance.

8. An aqueous solution as claimed in claim 3, which contains a flavouring agent.

9. An aqueous solution as claimed in claim 1, which is an alcoholic beverage comprising cynaropicrin in a concentration of from 50 to 500 mg/liter.

10. An aqueous solution as claimed in claim 9, which has a pH-value of from 3 to 5.

11. An aqueous solution as claimed in claim 9 wherein the alcoholic beverage is selected from the group consisting of beer, aperitif, liqueur and vermouth.

12. A process for the production of a bitter beverage comprising the steps of adding to an aqueous beverage solution, to impart a bitter taste to said beverage, cynaropicrin in a substantially pure and stable form, said cynaropicrin being in an aqueous medium maintained at a pH of 5.7, or below, and said cynaropicrin concentration in said beverage being at least about 10 mg/liter.

13. A process as claimed in claim 12, wherein the cynaropicrin is added in solid form.

14. A process as claimed in claim 12, wherein the cynaropicrin is added in the form of a concentrated solution thereof.

15. A process as claimed in claim 12, wherein said cynaropicrin is employed in an amount sufficient to impart to said beverage a cynaropicrin concentration in the range of from about 10 to 500 mg/liter.

16. In the process of preparing a beverage comprising preparing a bittering composition by extraction of a vegetable material containing cyaropicrin and adding said composition to a beverage solution; the improvement consisting of stabilizing a substantially pure cynaropicrin from said vegetable material by maintaining an acid pH of less than 7 during the extraction step whenever said cynaropicrin is in contact with water, and adding said substantially pure and stable cynaropicrin to said beverage in an amount sufficient to impart to said beverage a cynaropicrin concentration of at least about 10 mg of cynaropicrin per liter of said beverage and in the presence of a physiologically safe amount of an edible acid for maintaining said beverage at a pH of 5.7 or below.

17. A substantially stable and colorless cynaropicrin solution comprising said cynaropicrin dissolved in a solvent selected from the group consisting of water and mixtures of water and alcohol, said solution containing an acid in an amount sufficient to impart to said solution a pH of 5.7 or below and said cynaropicrin being dissolved in said solution in an amount sufficient to impart to said substantially stable and colorless solution a cynaropicrin concentration of at least about 10 mg cynaropicrin per liter of said solution.

18. A process as claimed in claim 12 wherein the pH of the aqueous medium is between 2.0 and 5.7.

19. The process according to claim 16 wherein the pH of said beverage ranges from about 2.0 to 5.7.

20. The substantially stable and colorless cyaropicrin solution according to claim 17 wherein said solution has a pH ranging from about 2.0 to 5.7.

* * * * *